US007851761B2

(12) United States Patent
Popa-Simil

(10) Patent No.: US 7,851,761 B2
(45) Date of Patent: Dec. 14, 2010

(54) MULTI-BAND TERAHERTZ RECEIVER AND IMAGING DEVICE

(75) Inventor: Liviu Popa-Simil, 3213-C Walnut St., Los Alamos, NM (US) 87544

(73) Assignee: Liviu Popa-Simil, Los Alamos, NM (US)

( * ) Notice: Subject to any disclaimer, the term of this patent is extended or adjusted under 35 U.S.C. 154(b) by 0 days.

(21) Appl. No.: 11/732,523

(22) Filed: Mar. 23, 2007

(65) Prior Publication Data

US 2007/0222693 A1 Sep. 27, 2007

Related U.S. Application Data

(60) Provisional application No. 60/786,169, filed on Mar. 27, 2006.

(51) Int. Cl.
*G01J 5/02* (2006.01)
*H01P 7/00* (2006.01)
*H01Q 15/00* (2006.01)

(52) U.S. Cl. ................. 250/341.1; 250/341.3; 333/219; 343/909; 359/246; 359/259

(58) Field of Classification Search .............. 250/338.1, 250/341.1, 341.3; 359/254, 246; 385/39, 385/129-132, 115; 333/219; 343/753, 909
See application file for complete search history.

(56) References Cited

U.S. PATENT DOCUMENTS 6,734,974 B2 5/2004 Jiang
6,828,558 B1 * 12/2004 Arnone et al. ........... 250/341.1
6,943,742 B2 9/2005 Holly
7,145,148 B2 12/2006 Alfano
7,170,442 B2 1/2007 Lovberg
2003/0179974 A1 * 9/2003 Estes et al. ...................... 385/2
2005/0093023 A1 * 5/2005 Raspopin et al. ............ 257/202
2005/0098728 A1 * 5/2005 Alfano et al. ............ 250/341.8

OTHER PUBLICATIONS

Liviu Popa-Simil, Multi-band Terahertz Imaging System Design, MRS-2005-Spring, Proceedings, Apr. 20, 2005, MRS, vol. JJ, San Francisco, USA.

* cited by examiner

*Primary Examiner*—David P Porta
*Assistant Examiner*—Jessica L Eley

(57) ABSTRACT

Multi-band polarized receiver-emitter THz domain visualization device that includes a group of elemental receiver units made from a resonant system sensitive to frequency and polarization, a micro-bead solid-state voltage amplifier in the gate of a differential FET system. The detection is based on the carrier perturbation method detected by a set of double gate comparator circuits that further generates an integrated signal driven to a digital analog converter. The signal from here is accessing event-based memory used to generate the 3D images. Multiple detection modules are coupled into a triangular detection element detecting a multitude of frequencies, in a cascade of bands from 2 mm to 1 micron. This THz chromatic detector is integrated in a surface morph array, or in an image area of a focusing device generating a pixel of information with band, amplitude, polarization and time parameters, driving to a complex 3D substance level visualizations.

13 Claims, 9 Drawing Sheets

MULTI-BAND TERAHERTZ RECEIVER AND IMAGING DEVICE

CROSS REFERENCE TO RELATED APPLICATIONS

This application claims the benefit of U.S. Provisional Application No. 60/786,169, filled on Mar. 27, 2006, which is hereby incorporated by reference in this entity.

BACKGROUND

During the past few decades, electromagnetic applications got a new dimension as solution to assure better communication and better imaging. The new instrumentation not only allowed to have better image, but to obtain images of the temperature distribution and more recently, of the molecular and atomic composition distribution. Developing visualization device in far Infra red presents tremendous advantages and focused the research of space agencies, defense and security as well many other private companies oriented to science. The THz wave emitters and receivers are less developed, compared to its neighboring bands (microwave and optical). During the past decade, THz waves have been used to characterize the electronic, molecular vibration and composition, properties of solid, liquid and gas phase materials to identify their molecular structures.

The Terahertz domain is the most uncovered, because the energies are small to be detected by the majority of the actual devices, while the dimensions are in the sub-millimetric domain. The problem of the ratio Signal/Noise ratio is difficult because the energy of a single 1 THz photon is 4.1 meV equivalent to a 47K temperature, requiring cryogenic electronics.

SUMMARY

According to one embodiment, the THz receiver is composed from a resonator wave input structure able to select the frequency, angle of incidence and polarization of the incident THz photons and harvest their energy loading the field inside resonating structure. The resonant structure said antenna has a device of discharging its energy into a set of shaped conductive beads generically called plasmon amplifier.

According to another embodiment the beads of the plasmon amplifier is operating as a voltage amplifier and applies its output the potential over the gate of an ultra low field effect active device, perturbing a reference signal generically called "carrier" passing through this active device.

According to another embodiment the field effect active device is optimally shaped in order to increase the field effect inside and to produce a nonlinear characteristic similar to that of a rectifier device. The device will transform the presence of a THz signal into a strong perturbation giving a non-null integral compared with the internal noise supposed to produce a symmetric perturbation.

To minimize the electronic noise in the input stages cryogenic temperature is recommended.

According to a further embodiment the detected THz signal integrated over a carrier half period is further applied to an analog-digital converter having no-dead time and generating the binary value into a stack memory, from where various processing may be performed. The main processing will be a carrier down-frequency conversion to the imaging devices frame rate for real time visualization procedures, or background correction.

According to another embodiment the resonant structures used for THz photon energy harvesting may be used for THz pulsed beam emission, if the same device is reversed, such as the differences in phasing of the carrier frequency to be transformed into a short transitory resonant structures loading pulse.

The general aim of the development is to produce narrow band emitter receivers in THz domain that to open the way to applications in molecular domain visualization and localization. The fast electronic devices are meant to assure detection power for chemical reactions visualization in the domain down to nanoseconds. The applications are drastically enlarged if the power of pulsed selected frequency and polarization is added by the use of THz pulse generation.

DETAILED DESCRIPTION

The generic diagram of a high frequency transceiver is based on a selective resonant element called antenna that adapts the ether impedance of about 377 Ohm at certain frequency to the electronic device impedance adjusting the electric parameters to best match the power transfer.

Figure 1:
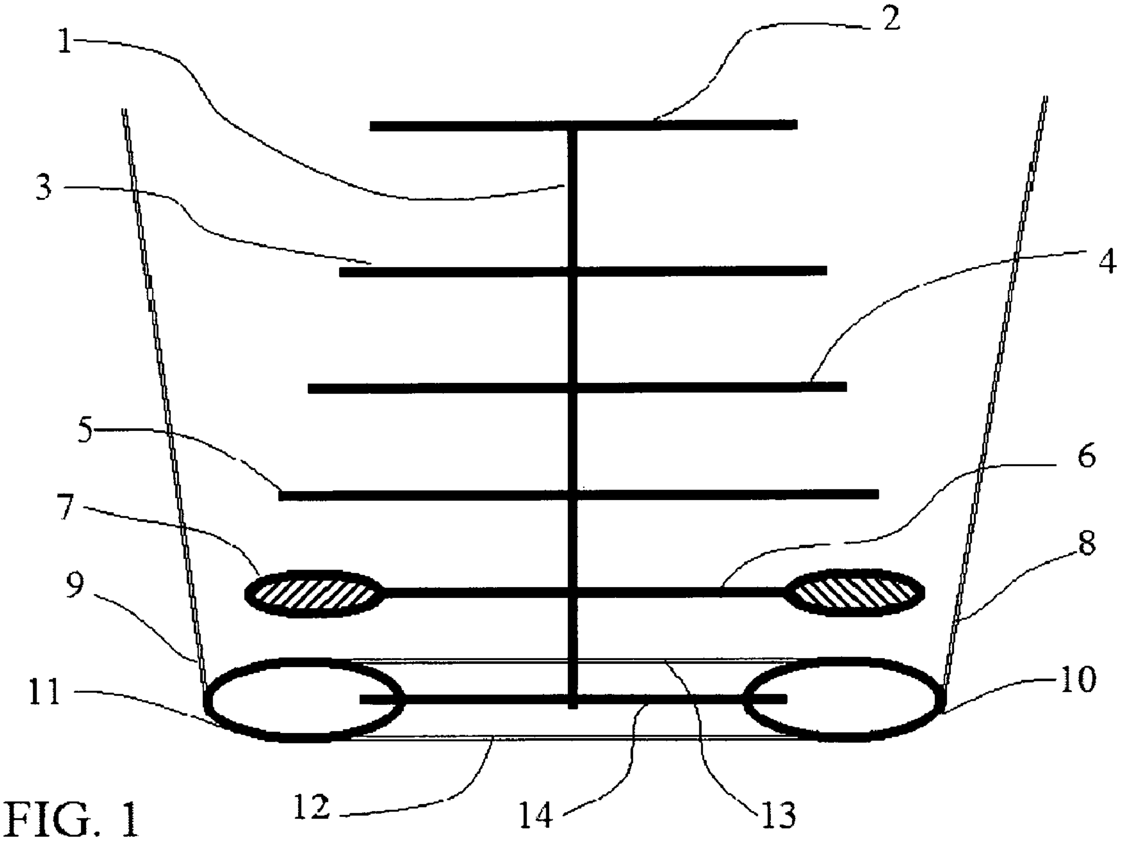
FIG. 1 shows the resonator structure input stage—principia diagram

FIG. 1 shows a generic resonant structure is made from conductive material, as Gold, Silver, etc. and it may have different shapes from those in the drawing as an embodiment of the invention. The real object being designed considering the variations of the shapes and electric parameters associated with the operation frequency such as to maximize the quality factor of the resonator.

In FIG. 1 a modified "yagi" like resonator device comprises central support 1 grounded and in good connection with the electromagnetic vibrators 2 that have a role in frequency and polarization selection of the incident waves. The flat structures are preferred due to easiness of buildup by lithographic or chemical vapor deposition means.

The antenna is using several vibrators 2, 3, 4, 5 or more which define the directivity, polarization, frequency band and the passive resonator signal amplification. The number of the resonator elements or the usage of phased parallel structures are mainly parametric design elements, and may be varied to meet the performance requirements of various designs.

The electrode 2 only, or the entire structure may be embedded into a dielectric material as diamond, silicon, germanium, resin, glass or ceramic transparent to THz frequencies with role in compaction and surface hardening.

The end electrode 6 is the receiver that has modified geometry allowing an enhanced voltage peak resonator made of shaped beads 7 with the dimension of about ⅛-1⁄16 the wave length, as the alternative voltage near field distribution to look as quasi-continuum.

The back reflector 14 has a lateral structure 12, 13 and signal passing grid holes 10, 11, connected to a lateral funnel structure 8, 9, which makes it look like a wave guide with the purpose to enhance the quality factor and the voltage on the beads 7.

The voltage buildup on the beads 7 is driven through the passages 10, 11 towards the solid-state passive voltage preamplifier made with plasmonic structures.

Figure 2:
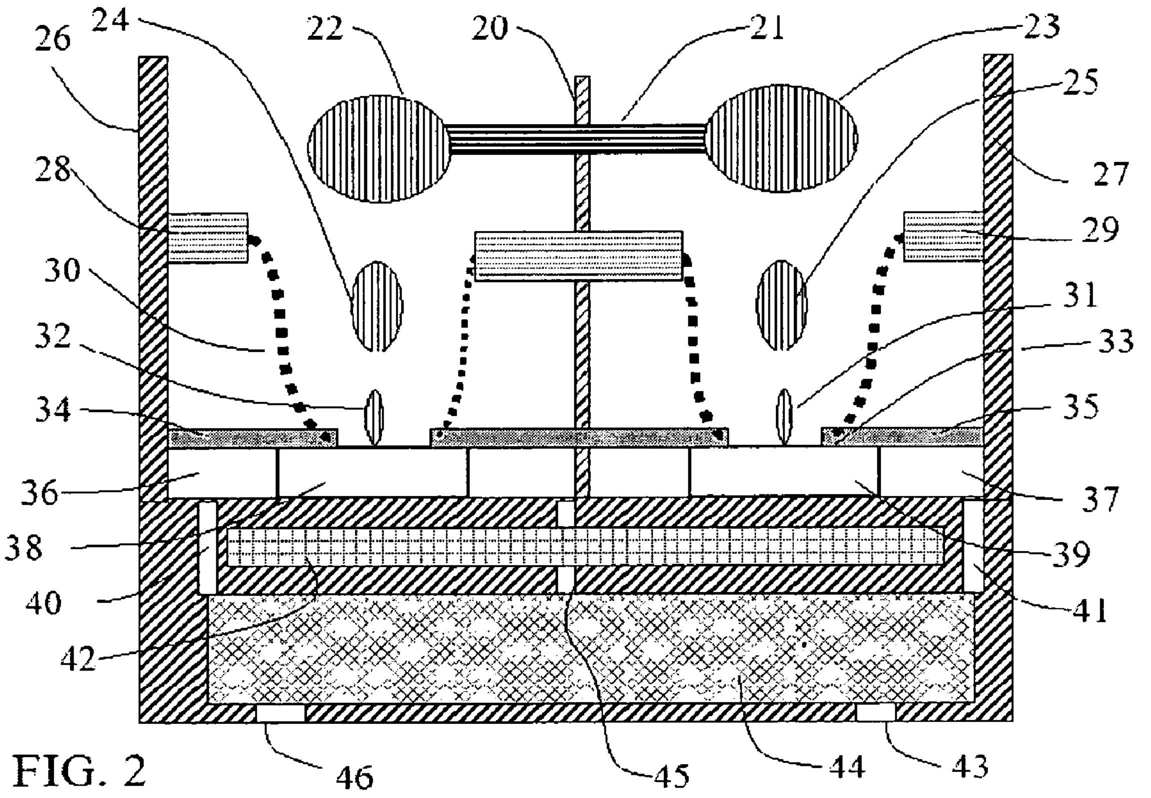
FIG. 2 shows in cross-section the resonator stage diagram coupling to the passive plasmonic electric field amplifier and this amplifier coupling to the active device.

FIG. 2 shows another embodiment of the invention in a cross section through the solid-state preamplifier and the field effect and/or ballistic active element with role in voltage amplification and signal detection. The input resonator structure output stage shown in FIG. 1 fuses with the input stage of the plasmon amplifier represented by the beads 22, 24, 32.

The central resonator axis 20 is the connected to the bottom support with the role in shielding and voltage reference and is in contact with the central support 1 in FIG. 1.

The resonator beads 22, 23 (corresponding to 7 in FIG. 1) are positioned on the support 21 (6 in FIG. 1) and connected to the central support 20 (1 in FIG. 1) and shaped such as the maximum voltage is obtained preferably towards the bottom surfaces 28, 29 (12-14 in FIG. 1) that are shaped in such manner to maximize the quality factor of the resonator. The components 22, 21, 28 and 29 in the compact version of construction are the same with the components 7, 6, 11, 10 while 20, 26, 27 are a continuation of 1, 9 and 8 respectively.

The bottom of the array contains the reflector surface 28, 29 connected to the lateral funnel structure 26, 27 (9, 8 respectively). There is possible that the left side structure delimited by surface 28 to resonate on a different frequency than the right side structure delimited by surface 29 modifying the shape of the frequency band.

The beads cascade 22,24,32 respectively 23, 25, 31 sustained and/or embedded on dielectric layers, or wires to maintain the right position to get the maximal voltage amplification.

The cascade has the number of beads given by the dimensions of the gate 31, 32 of the MOS-FET or ballistic FET formed using the last bead of the structure, and the wavelength that determines the dimensions of the entry beads 22, 23. The bids ratio, shape, positioning and the loss factors in the structural materials is given the voltage amplification coefficient.

The cascade ratio, beads shape and materials will be driven by the voltage maximization criteria and fabrication possibilities. A meshed structure 30 will be used to create dipolar effects amplification of the voltage in the beads locations.

The metallic 34,35 structure covers the FET active structure 38, 39 with the role of shielding the FET operating intermediary frequency in MHz to GHz domain.

The contacts and the mechanical structure of the electronics is made small and'planar placed in locations 36, 37 giving the minimal interference in the gate's space.

The funnel structure 30 and the beads 22,24,32 respectively 23,25, 31 are looking like a resonator "de-Q-ing" antenna, when matched, the resonator power is absorbed and transmitted through the metallic mesh funnel 30 in the FET gates 32 and 31 acting on active layers 38, 39 making the THz power extractionat the necessary level to influence the current passing through.

The active structure 38,39 is made by a tunneling electronics, ballistic transistor, field effect transistor, operating at a lower frequency in the MHz-GHz domain named "carrier".

The application of this high frequency variable voltage is increasing the scattering in one arm 36,38 while decreasing in the complementary one 37,39. The electrostatic scattered electrons of the carrier frequency corroborated to the influenced arrays in the active material interface or junction perturbs the shape of the low frequency signal which integrates the detection in a pulse with a length in time shorter than ½ of the carrier period that represents an embodiment of the invention. The amplitude is proportional with the THz signal.

The GHz perturbed signal is extracted through the communication spaces 40, 41, 45. in the comparator amplifier space 44. The temperature is maintained constant by a "Peltier" cooling device 42 surrounded by thermal conductive materials, to keep cryogenic temperatures in the sensitive elements and so to minimize the electronic noise. Vacuuming the device makes the transition to the upper surface's temperature and applying thermal shunts on the heat leakage tracks. Finally, the signal detected on intermediary frequency is extracted from the module 44 through the gates 43, 46.

The structure presented in FIG. 2 takes the THz selected signal prepared by the input structure in FIG. 1 and by a nonlinear process uses it to perturb a much lower reference frequency running in MHz or GHz domain, where the electronic devices are naturally operating making the function of a down-converter.

Figure 3:
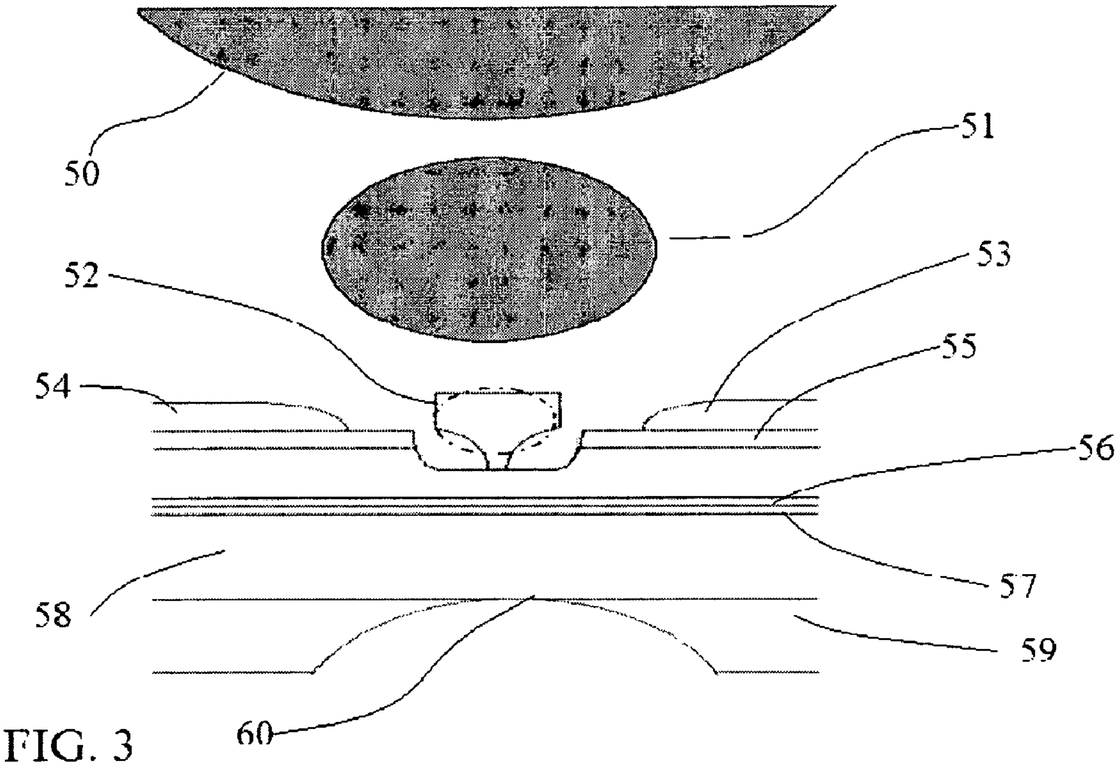
FIG. 3 shows a magnified cross section through the MOS/BET-FET gate and solid-state compact voltage amplifier

FIG. 3 shows another embodiment of the invention in a magnified cross section through the interface connection between the beads 50,51,52 (22, 24, 32 or 23, 25, 31 in FIG. 2) cascade making the plasmonic voltage amplifier and the MOSFET gate 52 (38, or 39 in FIG. 2) is made such as the dimension of the last bead to be compatible with the gate dimension in the range of 50-100 nm. The scaling factor and beads number is set to adjust upwards to the resonator (22, 23 in FIG. 2) dimensions and to obtain the optimal voltage amplification.

The FET's source 54 and the drain 53 are conductive layers screening the active semiconductor layer underneath constituting the elements, of the transistor junction like structure commanded by the gate 52 and placed in such a manner to make the noise rejection factor big, and no perturbation to be transmitted from below.

The "transistor" has various substrates like metallic plating 54, 55, a n-doped substrate 56, a insulator layer, oxide layer 57, and chip's substrate 58. The metallic backing 60 is used for electric conductivity purposes and heat homogenization.

To enhance the detection properties a special shaped FET have to be developed by bending the actual thin structure along the symmetry central axes forming a needle shaped tip for the gate of an appropriate radius to connect to the bead 51. In this way the transistor will look like a needle tip getting out of the metallic surface.

The diamond based electronics for very low currents may be used. The main idea is that with the tiny voltage a THz photon may create, to become able to perturb a lower frequency carrier signal in order to detect the presence and intensity of a specific THz electro-magnetic field. This setup has the role to convert the voltage generated by the "plasmon amplifier" into a low frequency signal in the form of a carrier signal amplitude perturbation compatible with the actual electronics.

Figure 4:
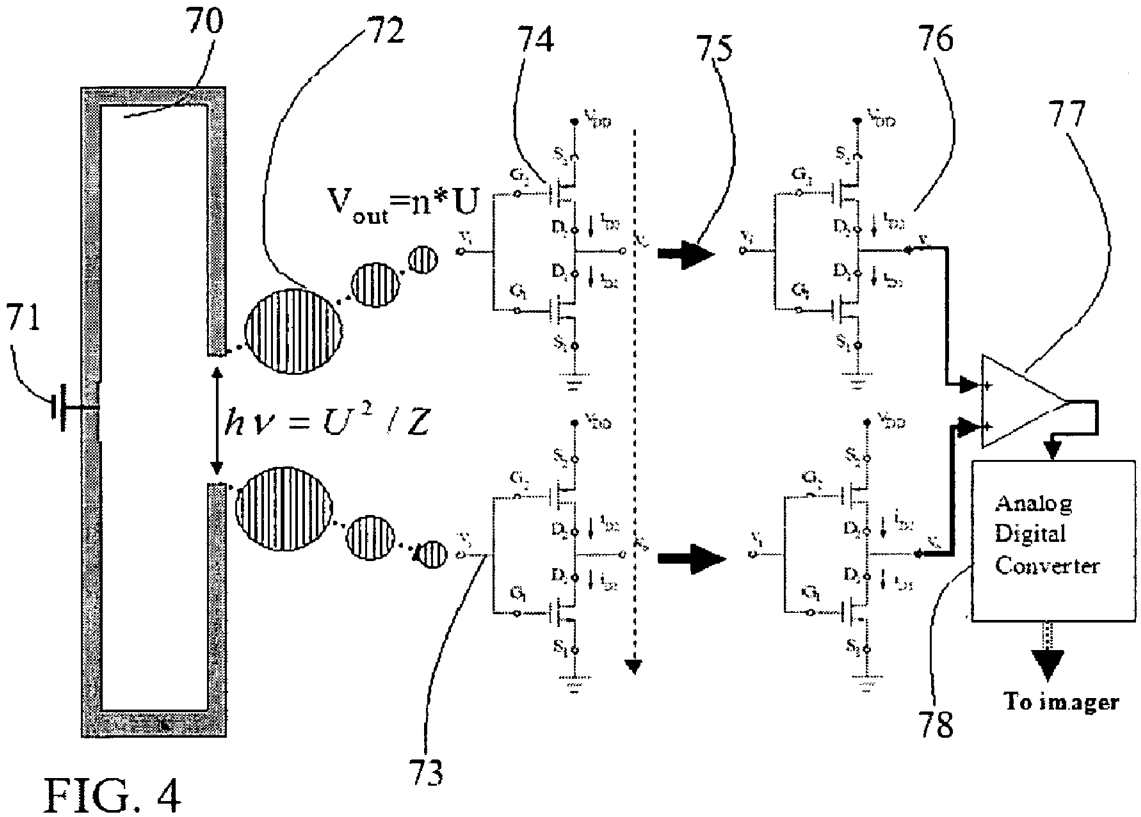
FIG. 4 shows the signal schematic flow diagram from the THz input resonator to ADC

FIG. 4 shows the complete detection sequence of the Thz receiver an embodiment of the invention. The THz photons are hitting the resonator cavity 70, having the grounded funnel wall structure 71 (8, 9 in FIG. 1) such to function like an open wave guide, with the special resonant structure in the middle to select the right wave and match polarization and frequency. The selected wave by matching wave length and polarization builds up the voltage in the resonator, that is further transmitted and amplified through the chain of beads 72 (50, 51, 52 in FIG. 3) towards the gate of the low current MOS-FET like structure 73 and 74 (38, 39 in FIG. 2) operating in the nonlinear domain of their characteristics and asymmetrically varying their equivalent resistance and perturbing the alternating carrier MHz/GHz frequency.

The perturbed—carrier—signal is transferred through an adapter circuit 75 to be further amplified in a secondary stage 76 and applied to a double comparator 77 that extracts the perturbation only. In this way is performed a down transition from the THz domain to MHz or GHz domain making the signal compatible with a no dead time analog digital converter 78 that digitizes the signal and stores it into a multiple access buffer memory. There is the process computer, called imager, that takes the data from this buffer memory and process it in accordance with the detection structure, calibration and code.

Figure 5:
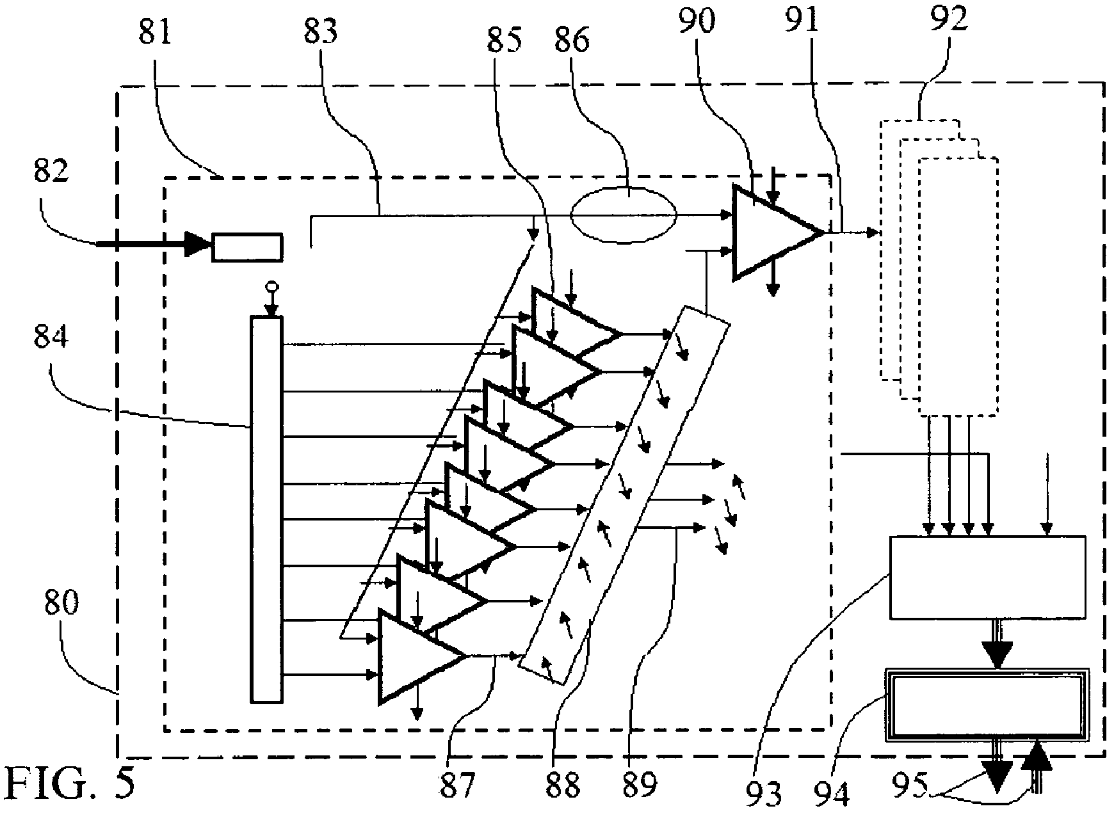
FIG. 5 shows the real-time on flow digital analog converter for microwave and THz applications with fast data acquisition in a schematic diagram.

FIG. 5 shows another embodiment of the invention, in the schematic diagram of the zero-dead-time analog digital converter 80 composed from several direct converting modules 81, 92 based on comparators 85 which generates a digital line 87 outputs applied in a buffer 88 from where is converted in hexadecimal signal 89. The signal 82 representing the perturbation is entering an impedance adapter 83 and is applied to the parallel structure of comparators 85 to take the reference from the voltage divider 84 powered in very stable conditions. The signal is also applied to a delay line 86 and a new differential amplifier 90 in which the reference is dynamically build so only the truncation difference is amplified and passes through by 91 output to a chain of converters 92 similar to 81.

A plurality of $2^n$ amplifiers chain producing at each stage the most significant n bits can be connected in series until the last significant bits become meaningless. These bits are grouped in a data bus and sent to a multiple direct access memory buffer 93, 94. The memory module 94 is used for online processing in real time providing the compact data to various computer buses 95.

Figure 6:
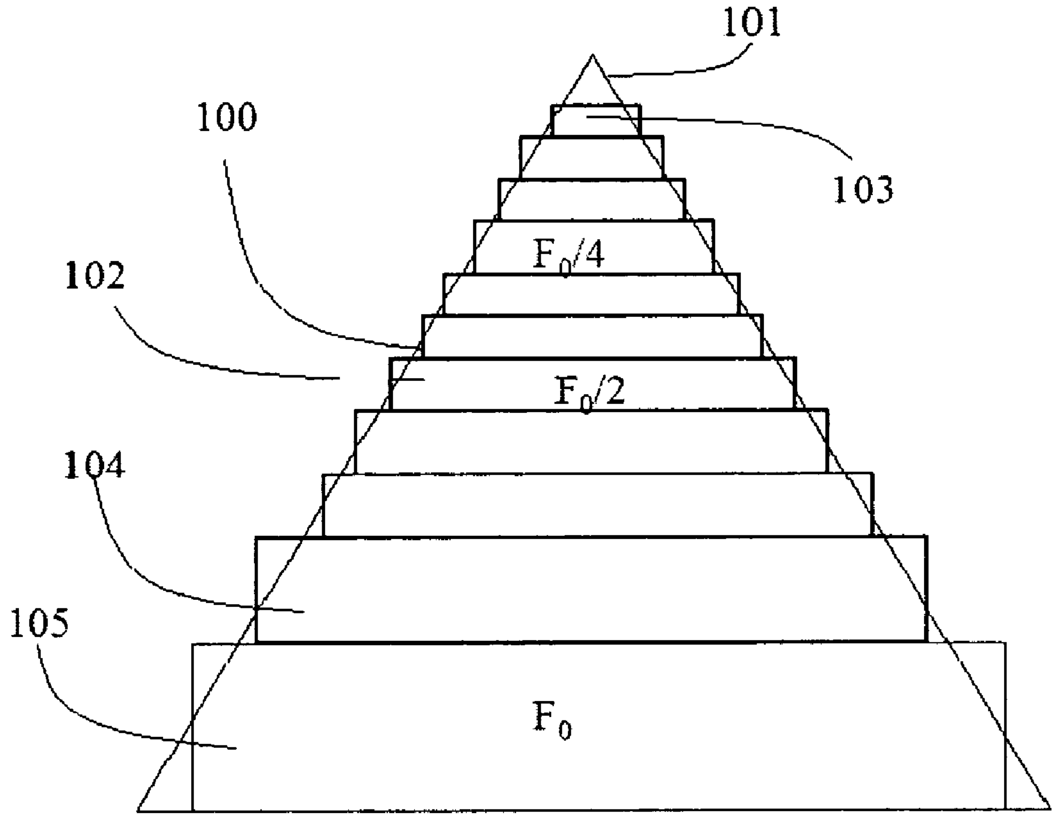
FIG. 6 shows the multi-band module array that constitutes the elementary spectral detection unit

FIG. 6 shows an assembly of the THz band detection device as one embodiment of this invention that consists in a solid-assembly of the devices described in the previous figures each operating on a defined frequency, with controlled polarization and directivity, representing a unit with the highest frequency and minimal dimensions 103, with an intermediary frequency 104, or with the lowest frequency and bier dimensions 105, etc. The elemental unit 102 of the assembly 101 is obtained by building tight together the input resonator structure 70 in FIG. 4 followed by the solid state "plasmon amplifier" 72 in FIG. 4 sticked into resonator, with the amplification elements 74 to 77 mounted compact on the active element 74 build with the plasmon resonator incorporated over its gate, all together being packed in a single case.

The individual devices were compacted in a triangular structure, scanning all the range in dedicated frequency bands. This creates a triangular multi-band module 100 according to an embodiment of this invention. The frequency step will determine the shape of the triangle. The electronics have been attached on all the receivers in the module. This device makes possible fast monitoring at the assembly's carrier frequency and the real time visualization at the human eye speed.

Figure 7A:
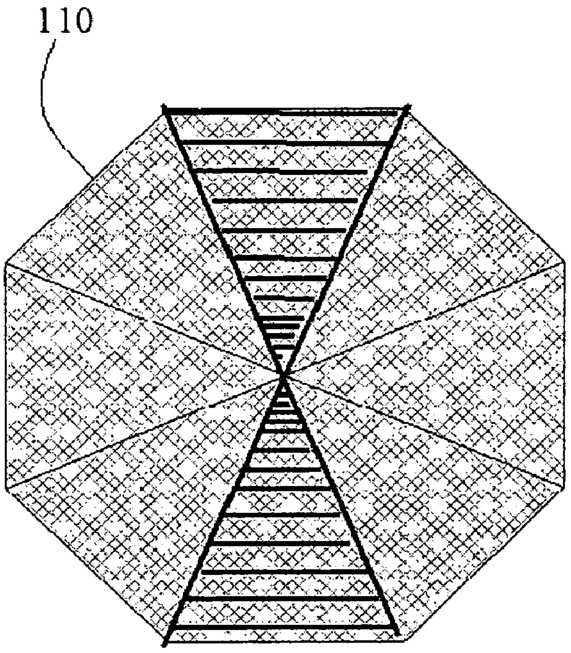
FIG. 7 shows a composite detection element using several multi-band modules, placed to detect different polarization planes.
Figure 7B:
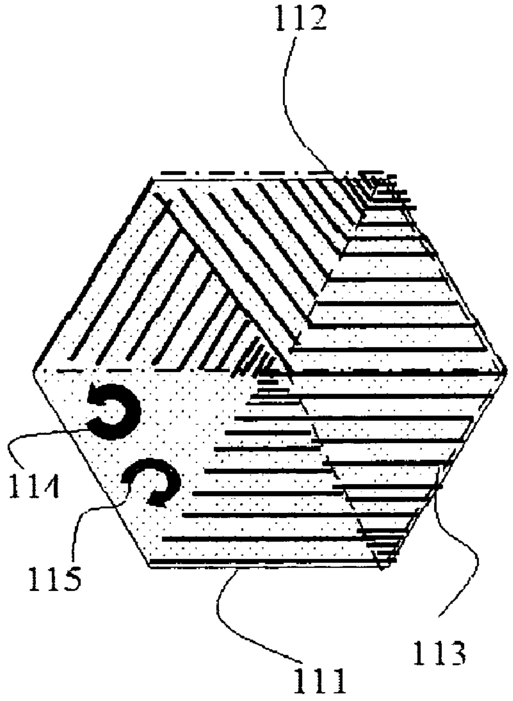

FIG. 7*a* shows another embodiment of the invention regarding the multi-band modules that might be grouped based on shape in various combinations creating units in octagons 110 while FIG. 7*b* shows possible resonators grouping combinations in hexagons 111, trapezes 112, parallelograms, rhombs 113 and other centered polygons. The resonant polarization selective structures may provide various bands and polarization combinations (planar, circular, elliptic) even detecting the polarization advance rotation versus left (levogir) in 114 or right (dextrogir) in 115. The structures may be prisms or pyramids matching in planar or curved surfaces to morph on the shape of the supporting surface. This multiple band controlled polarization array makes possible the signature analysis for molecular identification with temperature and density evaluation. The plurality of such cells used makes possible various type of visualization from planar imaging as human eye, to fly eye or tri-dimensional material localization with various visualization routines to become accessible to humans as pseudo-color and/or stereoscopy.

Knowing, based on recent measurements, that the photon has a finite dimension and length containing about 10 thousands to 1 billion oscillations and a specific with and shape, the invention makes various combinations to detect the polarization and locality of bunches of photons.

This module establishes multi-band, multi-polarization information usable for material chemical identification based on pseudo-chromatics analysis where it is possible. There is also known that the THz domain is well populated so a background extraction of the thermal photons will be required. The plurality of frequencies contributes to a good evaluation of the Plank thermal emission curve and extraction in order to enhance contrast for molecular distribution and state visualization.

Figure 8:
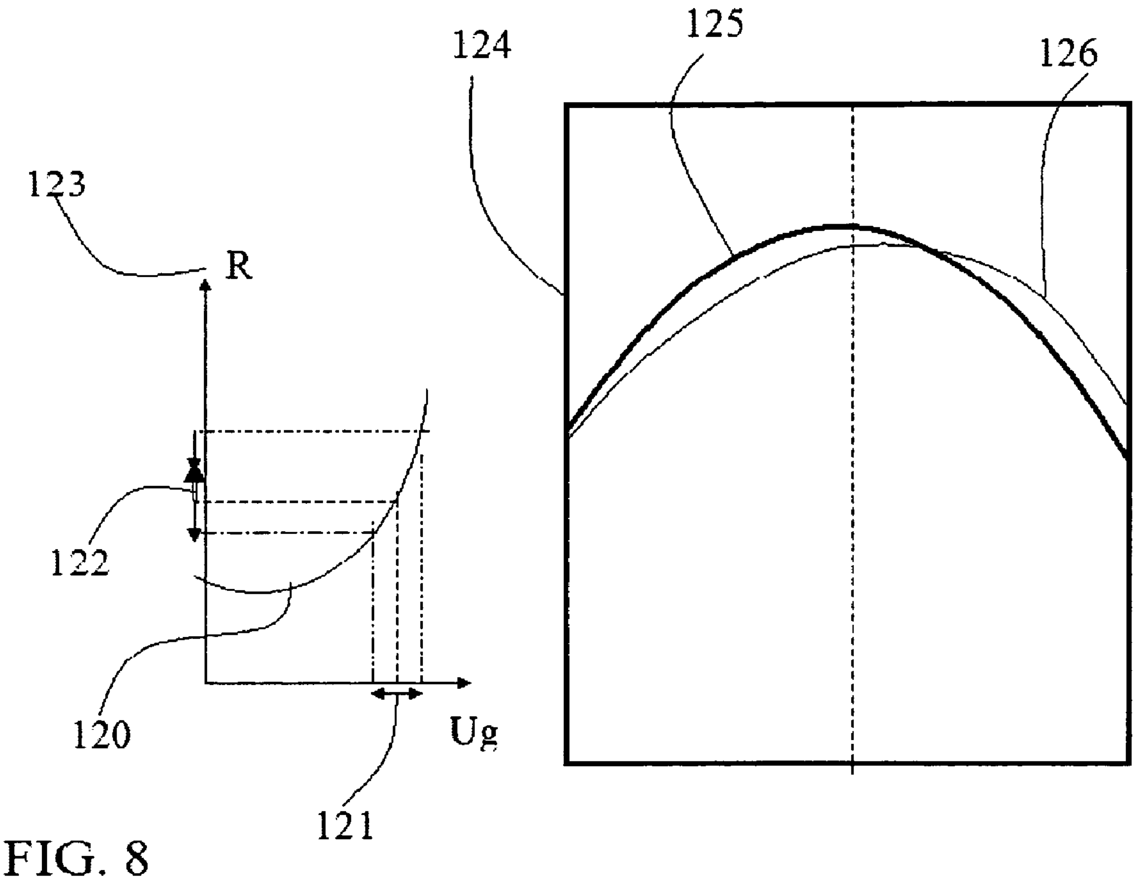
FIG. 8 shows the principle of THz detection based on nonlinear carrier perturbation

FIG. 8 shows another main embodiment of the invention, is the method of carrier perturbation used for THZ detection that consists in asymmetrical perturbation of the gate of a MOS-FET or ballistic FET like active device of a special design by an ultra high frequency not even detectable by the normal operation of the component.

The invention is based on the usage of a nonlinear active device that makes the difference between the presence of the THz wave and the thermal noise. At this frequency the perturbation have to be applied in the nonlinear characteristics 120 of the FET Response 123 which for a high frequency gate perturbation by a Voltage 121 the response 122 becomes asymmetric so the integral in the response time gives a non-null component. So, the intermediate frequency voltage 124 supposed as being a sinusoidal wave 125 will record a distortion like perturbation 126, which will have a non null integral over the response time period of the comparator which have to be 3-10 shorter then the period of the carrier frequency in GHz. This will impose the timing of the illumination profile in THz bands. Faster modulation will be detected only by the cumulative effect. The requirement to minimize the electronic thermal noise in the input stages will drive to cryogenic resonator and plasmon amplifier devices and a good faceting of the beads with low electronic emission materials having low multipactor factor and low electron rattle noise.

As conclusion of one of the main embodiments of the invention, the amplification is measuring the distortions of the perturbed GHz-MHz wave compared with a reference signal, and assumes proportionality with the THz signal's intensity.

Figure 9:
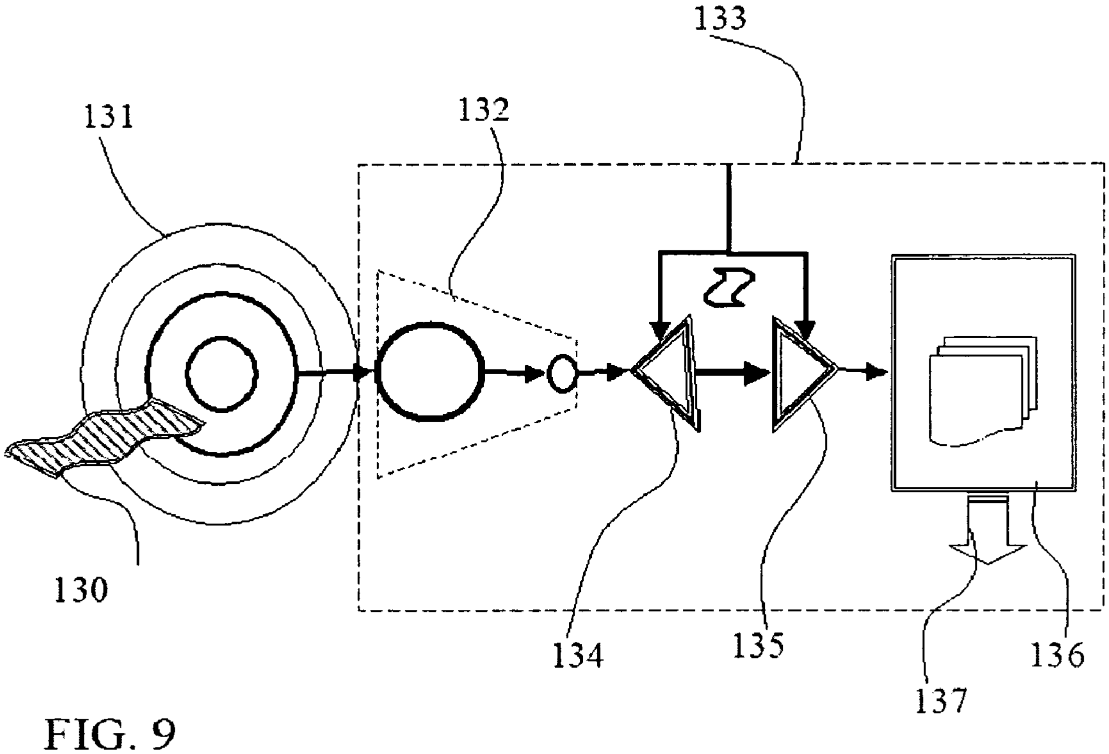
FIG. 9 shows the schematic diagram of the signal flow from detection to imaging system data storage

FIG. 9 presents a synthesis of the THz signal detection method with the main embodiments. The fact that most of the conductors remains conductors even in various bands in the THz domain except for resonance where they have an anomalous behavior drives the application of the resonant structures in the THz domain as a main embodiment of the invention.

The THz signal 130 is therefore according to the invention selected and amplified in the resonant structure 131, and transmitted to the plasmonic amplifier 132. The input resonator features as central frequency, bands with and position, directivity and polarization will be application dependent and subject to design optimization.

The plasmonic amplifier output is attacking the gate of a shaped active element 134 that runs through a special shaped signal generically called "carrier" in a low frequency domain, lower than its cut-off or maximum operating frequency of the electronics used. The THz signal is perturbing the "carrier" signal as an asymmetric noise. This built in asymmetry makes the difference between the presence of the THz signal and the electronic noise being a kind of THz signal rectification as shown in FIG. 8. Further, the carrier signal perturbed by the THz frequency and the original unperturbed carrier signal is applied to a differential amplifier 135 and the integrated THz perturbation signal is extracted and applied to the ADC converter 136.

The Analog-Digital Converter 136 has a no-dead time feature useful for continuous conversion the digital data extracted 137 is loading a stack memory. All the electronics 133 is closely mounted on a customized chip near the resonator.

What is claimed is:

1. A detector of THz signal comprising:

a resonant input stage;

a passive solid-state voltage amplifier;

an electric field amplifier; and an Analog Digital Converter and memory;

wherein the passive solid-state voltage amplifier comprises a plurality of shaped conductive beads in cascade, embedded in a controlled position in a dielectric medium, to make a voltage plasmon amplifier.

2. A detector of THz signal as recited in claim 1, wherein the resonant input stage comprises a conductive structure comprising a plurality of conductive elements from the group consisting of polarizing vibrators, resonators and reflectors which drive electromagnetic power to a higher voltage bead concentrator interface, matched on the resonant frequency.

3. A detector of THz signal as recited in claim 2, wherein the polarization sensitive resonator conductive structure further comprises an antenna which is able to receive or emit polarized directive signals.

4. A detector of THz signal as recited in claim 1, wherein the electric field amplifier comprises an active electronic device made from one of a MOS or ballistic—FET gate interface, attached to an output voltage of the passive solid-state voltage amplifier.

5. A detector of THz signal as recited in claim 4, wherein the electric field amplifier comprises a special shaped angular geometry field effect transistor which has a high impedance resistor with nonlinear characteristics.

6. A detector of THz signal as recited in claim 1, comprising an wherein the electric field amplifier comprises a FET amplifier which perturbs a lower frequency signal in the MHz-GHz domain which is accessible to semiconductor based electronic devices.

7. A detector of THz signal as recited in claim 1, having a differential amplifier that amplifies the difference between a reference signal and a signal on MOSFETs containing the THz signal.

8. A detector of THz signal as recited in claim 1, wherein the analog digital converter may comprise a plurality of analog digital converters where the conversion is made by a plurality of fast-comparators biased at a reference voltage followed by a binary converter having the residual signal coupled by a delay line to a next digitization stage.

9. A detector of THz signal as recited in claim 8, wherein the ADC comprises a differential amplifier gate which couples the signal from a delay line to said ADC to compensate for electronics delay and phase shift between stages to make real time conversion of the detected signal.

10. A multi-spectral cell comprising a plurality of detectors as recited in claim 1 tuned in different THz bands and wave polarizations assembled in a triangular base forming a module with a plurality of frequency bands and polarizations.

11. A visualization unit comprising a plurality of multi-spectral cells as recited in claim 10 mounted and coupled.

12. A detector of THz signal as recited in claim 1, wherein the passive solid stage voltage amplifier works in a bi-directional mode to amplify or emit narrow band THz frequency.

13. A detector of THz signal as recited in claim 1, wherein the plurality of shaped conductive beads are deposited by delta layers and faceted to minimize the electron thermal noise.

* * * * *